United States Patent [19]

Magiera et al.

[11] Patent Number: 5,945,593

[45] Date of Patent: *Aug. 31, 1999

[54] METHOD FOR SELECTIVELY TESTING FOR LEAKAGE OF COMBUSTION CHAMBERS OF CYLINDERS OF INTERNAL COMBUSTION ENGINES

[75] Inventors: Ralf Magiera, Neuenrade; Christof Howold, Iserlohn, both of Germany

[73] Assignee: AFT Atlas Fahrzeugtechnik GmbH, Werdohl, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,521

[22] Filed: Aug. 14, 1997

[30] Foreign Application Priority Data

Aug. 16, 1996 [DE] Germany .......................... 196 33 068

[51] Int. Cl.⁶ ............................. G01M 15/00; G01L 1/00; F02B 1/00

[52] U.S. Cl. ................................. 73/49.7; 73/115; 73/116; 73/117.3; 73/47

[58] Field of Search ........................... 73/47, 49.7, 118.1, 73/115, 116, 117.2, 117.3, 714, 744

[56] References Cited

U.S. PATENT DOCUMENTS

| | | | |
|---|---|---|---|
| 3,823,606 | 7/1974 | Maringer | 73/115 |
| 3,839,906 | 10/1974 | Hanson | 73/115 |
| 4,483,183 | 11/1984 | Suzuki et al. | 73/115 |
| 4,505,152 | 3/1985 | Haddox | 73/117.2 |
| 4,633,707 | 1/1987 | Haddox | 73/47 |
| 4,744,243 | 5/1988 | Tanaka | 73/115 |
| 5,417,109 | 5/1995 | Scourtes | 73/115 |
| 5,492,006 | 2/1996 | Beckett | 73/115 |
| 5,531,100 | 7/1996 | Mezger et al. | 73/49.7 |
| 5,585,549 | 12/1996 | Brevick et al. | 73/49.7 |
| 5,616,834 | 4/1997 | Lynch et al. | 73/115 |
| 5,648,602 | 7/1997 | Hoshina et al. | 73/115 |
| 5,786,531 | 7/1998 | Lewis et al. | 73/116 |

Primary Examiner—George Dombroske
Attorney, Agent, or Firm—Darby & Darby

[57] ABSTRACT

The invention relates to a method for selectively testing leakage of combustion chambers in cylinders of internal combustion chambers when the engine is operated with the combustion process suppressed. The internal combustion engine is provided with means for measuring the crank shaft rotation angle and for measuring the instantaneous rotational speed of the crank shaft and wherein the leakage of the combustion chambers is tested during expansion of the gas mixture during the combustion stroke and/or during compression of the gas mixture during the compression stroke of the cylinders of the internal combustion engine.

11 Claims, 7 Drawing Sheets

Angle of Rotation of
Crankshaft/Camshaft

METHOD FOR SELECTIVELY TESTING FOR LEAKAGE OF COMBUSTION CHAMBERS OF CYLINDERS OF INTERNAL COMBUSTION ENGINES

BACKGROUND OF THE INVENTION

1. Field of the Invention

The present invention relates to a method for selectively testing for leakage of combustion chambers in cylinders of internal combustion engines when the engine is operated while the combustion process is suppressed. In this method, an internal combustion engine is provided including means for measuring the crank shaft rotation angle and for measuring the instantaneous rotational speed (RPM) of the crank shaft.

An engine may be operated in a state of suppressed combustion, when the engine is started with an electric starter, or when a motor vehicle coasts downhill with the engine clutch engaged and with a fuel cut-off circuit activated.

2. Description of the Related Art

Evaluating the compression of a multi-cylinder internal combustion engine is known, see, for example, DE 43 37 720 A1. This reference discloses evaluating a signal which is proportional to the starter current when the internal combustion engine is started. More specifically, the rather significant increase of the required starter current is evaluated when the gas mixture is compressed during the compression stroke of a cylinder.

If a cylinder is for any reason not properly sealed, then this condition can be identified by the decrease in the ordinarily required starter current. This method for testing for leakage in the combustion chambers is useful for internal combustion engines equipped with an electric starter, when the engines are neither provided with means for determining the crank shaft rotation angle nor with means for measuring the instantaneous crank shaft RPM. The method has disadvantages because the leakage of the combustion chambers can only be tested when the gas mixture is compressed during the compression stroke of the cylinders of the internal combustion engine. Moreover, the components required for measuring the starter current can be used only for testing the leakage itself which renders this method for testing the leakage or tightness uneconomical and expensive.

SUMMARY OF THE INVENTION

It is the object of the invention to provide an improved method for testing the leakage of combustion chambers. In the method of the invention, the leakage of the combustion chambers in cylinders of an internal combustion engine is selectively tested at different operating strokes of the internal combustion engine and is based on generally available standard engine information.

This object is obtained by providing a method for selectively testing the leakage of combustion chambers. The crank shaft rotation angle and the instantaneous crank shaft RPM are thus determined during the combustion stroke when the gas mixture expands, and/or during the compression stroke when the gas mixture is compressed. Because, due to thermodynamic principles, compression of the gas mixture during the compression stroke is less dependent on the leakage of the combustion chamber than the expansion of the gas mixture during the combustion stroke, the leakage is preferably tested during the combustion stroke. Parameters which correlate with the compression pressure in the cylinders, are determined from a curve form of the instantaneous crank shaft RPM by, for example, a controller. The compression pressure is a quantity which can serve as a test for the leakage or tightness of the respective cylinder and which by itself or via parameters associated therewith, can indicate selectively for each cylinder if leakage of the combustion chambers during the combustion stroke and/or the compression stroke of the cylinders of the internal combustion engine is present.

Even when the combustion process is suppressed, the crank shaft RPM increases during the combustion stroke, depending on the compression pressure in the cylinders, as a result of the expansion of the gas mixture which had been compressed during the compression stroke.

From the form of the plotted curve representing the crank shaft RPM over a crank shaft rotation angle of 720 degrees, two types of characteristic parameters can be evaluated: average RPM values formed over a crank shaft rotation angle of 720 degrees, divided by the number of cylinders, or RPM amplitudes.

These characteristic parameters do not provide an undistorted representation of the cylinder-selective compression pressure, because they are altered in different ways in the various RPM regions by RPM-dependent cross-factors. Cross-factors are defined as the undesirable property of a cylinder-specific parameter that a change in one parameter of one cylinder is also reflected in the parameter of another cylinder.

Preferably, one characteristic parameter selected for testing for leakage of the combustion chambers are the RPM amplitudes which are determined, for example, by a controller, from the plotted characterizing curve of the instantaneous crank shaft RPM.

More specifically, the RPM amplitudes are determined from the curve forms of the instantaneous crank shaft RPM by averaging several instantaneous crank shaft RPM values at the same rotation angle of the crank shaft during the periodically repeating operating cycle of the internal combustion engine, with one operating cycle including two crank shaft revolutions.

When the internal combustion engine is cooled down, the engine can be briefly operated with combustion before the cylinder-selective leakage test of the combustion chambers is performed.

In an advantageous further improvement of the invention, the rotation angle of the crank shaft is measured with a measuring device comprising signal transmitters disposed on the crank shaft, wherefrom the instantaneous crank shaft RPM values are determined by a processor.

In order to uniquely associate the operating cycle with the rotation angle of the crank shaft, the cam shaft can be provided with a measuring device comprising signal transmitters which permits the determination of the rotation angle of the cam shaft.

As a result, information is provided indicating if a cylinder is performing the $1^{st}$ or $3^{rd}$, or the $2^{nd}$ or $4^{th}$ operating stroke, respectively.

In addition, the performance of the measuring device of the crank shaft and of the measuring device of the cam shaft can be monitored. The ratio of the signals transmitted by the respective signal transmitters of the two measuring devices is required to remain constant.

In another advantageous improvement, a respective marker of the measuring device of the crank shaft and a respective marker of the measuring device of the cam shaft are used for identifying a predetermined rotation angle of the respective shaft.

In another advantageous improvement, signals transmitted by signal transmitters of the crank shaft and of the cam shaft can be utilized to test the synchronization between the crank shaft and the cam shaft.

The rotation angle of the crank shaft and the crank shaft RPM can alternatively also be determined from the rotation angle of the cam shaft.

In another advantageous improvement of the invention, the curves of the instantaneous crank shaft RPM and/or of the cylinder-selective characteristic parameters are stored in memory for comparative purposes. The parameters can be stored after manufacture of the internal combustion engine, after a repair or after arbitrarily selected time intervals.

The method for selectively testing leakage of combustion chambers will now be described in detail with reference to an exemplary embodiment of a four-cylinder internal combustion engine for the combustion stroke.

Selectively testing leakage of combustion chambers is generally implemented in a motor vehicle in conjunction with a PLI system ("Pump - Line - Injection nozzle") forming a part of a more extensive engine control system.

With a PLI system, each cylinder of the internal combustion engine is provided with its own independent fuel supply system, each fuel supply system comprising an injection pump, a line and an injection nozzle.

With a PLI system, the selectively testing average pressures during the combustion can be set equal or unequal with a preset deviation, wherein the PLI system is used, for example, for compensating for differences between individual components. The average pressure is a quantity derived from the curve form of the pressure in the combustion chamber during the combustion stroke of a cylinder of the internal combustion engine and can be used as a measure for the converted energy. The same measuring devices of the crank shaft and of the cam shaft are used here for sensing and determining the instantaneous crank shaft RPM values required for testing leakage or tightness. Characteristic parameters correlated with the cylinder-specific compression pressure during the combustion stroke are derived from the instantaneous crank shaft RPM with the help of a controller.

For determining the instantaneous crank shaft RPM, the crank shaft is provided with a measuring device and processor means wherein the signal transmitter is a transmitter wheel rotating with the crank shaft and the measuring device is provided with 36 markers and one additional marker, with all of the markers sensed by an inductive sensor. The additional marker identifies an angular position of the crank shaft during the operating cycle of the internal combustion engine, which is recognized by the controller, e.g. the top dead center of the cylinder #1. During one revolution of the crank shaft, the processor means determines 36 instantaneous crank shaft RPM values from the signals generated by the inductive sensor. Consequently, the controller has available information about the crank shaft RPM and the rotation angle of the crank shaft with a resolution of 10 degrees.

For a unique correlation between the periodic operating cycle of an internal combustion engine which comprises two crank shaft revolutions, and the rotation angle of the crank shaft, the cam shaft is also provided with a measuring device for measuring the rotation angle of the cam shaft.

The signal transmitter of the measuring device of the cam shaft is a transmitter wheel rotating with the cam shaft and provided with 12 markers and one additional marker, with all the markers sensed by an inductive sensor.

The additional marker identifies an angular position of the cam shaft which is recognized by the controller. From the signals transmitted by the inductive sensor, the controller can determine the cam shaft RPM and the rotation angle of the cam shaft with a resolution of 30 degrees.

Through the measuring device of the cam shaft, the controller can correlate an event occurring during the periodic operating cycle of an internal combustion engine which comprises two crank shaft revolutions, with a change in the instantaneous crank shaft RPM. For example, the controller can correlate an increase in the crank shaft RPM with the expansion of cylinder #3.

The two independent measuring devices of the crank shaft and of the cam shaft can be used by the controller to permanently and reciprocally monitor the respective performance thereof. In the present example, the ratio of the signals transmitted by the crank shaft sensor to the signals transmitted by the cam shaft sensor has to be 3:1. If the ratio deviates from this value, then the controller recognizes that one of the measuring devices is malfunctioning, with the result that all control processes based on these measuring devices are deactivated until the malfunction is corrected.

The signals generated by the additional markers on the crank shaft and on the cam shaft, respectively, can be used by the controller to check the synchronization between the crank shaft and the cam shaft.

Since the cylinder-specific compression pressures cannot be determined directly, a suitable characteristic parameter has to be supplied which can be obtained for each cylinder and which can serve as input information for the controller. This parameter has to have the characteristic feature that the differences between parameters can be correlated in the best possible manner with the differences between compression pressures. Although averaged RPM values are strongly influenced by cross-factors, they are as a result of the extended measuring time not particularly sensitive to positioning errors of the crank shaft markers; such positioning errors become more serious at high crank shaft RPM values. Particularly insensitive to cross-factors are the RPM amplitudes values which, as a result, are the preferred parameters for testing for leakage of combustion chambers wherein the test takes place during the starter-activated operation at crank shaft RPM values of up to 300 rpm.

After two rotations of the crank shaft, a four-cycle internal combustion engine has completed one operating cycle, wherein each cylinder has executed one combustion stroke. From the 72 instantaneous crank shaft RPM values over a rotation angle of the crank shaft of 720 degrees, the controller then determines a curve form which is similar in appearance to the absolute value of a sine wave. This curve form reflects the expansion of the gas mixture compressed during the compression stroke of the cylinders.

Such a curve for a four-cycle internal combustion engine is depicted in FIG. 1, wherein the cylinder #1 after FTDC 1 (top dead center of the first cylinder before ignition, i.e. before the combustion stroke) exhibits in the interval of the rotation angle of the crank shaft between 0 and 180 degrees less of an increase in the crank shaft RPM than the other three cylinders.

The test for the leakage of the combustion chambers is generally performed before the internal combustion engine is first started, i.e. when the engine is still cold. Preferably, no measurements should be performed during the first few revolutions in order to condition the frictional and sealing properties. If the internal combustion engine is cooled down, the engine can be briefly operated with combustion before the leakage of the combustion chambers is tested.

When the combustion chambers are tested for leakage, the controller is responsible for determining selectively testing differences in the increase of the instantaneous crank shaft RPM during the expansion of the gas mixture during the combustion stroke. Basically two methods are provided for determining cylinder-selectively if the increase of the instantaneous crank shaft RPM is insufficient:

1. The cylinder showing the largest increase in the instantaneous crank shaft RPM values is identified and this cylinder is used as reference for evaluating all other cylinders. However, the RPM amplitudes strongly depend on the test conditions (for example, the temperature), making it rather pointless to assign absolute quantities to the leakage of the combustion chambers; therefore, the highest measured instantaneous crank shaft RPM is assigned a value of 100%, whereafter it is determined which percentage of that value is attained by the other cylinders. This method is also capable of detecting leaks on more than one cylinder during testing.

2. Moreover, differences can be determined and evaluated between the curve form of the actual leakage test and the curve form of one (or several) stored leakage tests. With this method, leaks can also be detected which have occurred uniformly on all cylinders over an extended period of time. The curve forms of the crank shaft RPM values or of the characteristic parameters derived therefrom can be stored, for example, immediately after manufacture of the internal combustion engine, after a repair, after a predetermined time interval, or after every leakage test.

If, during the leakage test of the combustion chambers, the controller detects a deviation between the RPM amplitude of one cylinder and the largest RPM amplitude of all cylinders which is greater than a permitted value, then the result can be displayed to the driver of the vehicle and/or stored and recalled for diagnostic purposes in a service facility. If necessary, the controller can adjust the engine control accordingly if a leak is found in a combustion chamber.

BRIEF DESCRIPTION OF THE DRAWINGS

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

In the drawings, wherein like reference numerals delineate similar elements throughout the several views.

DETAILED DESCRIPTION OF THE PRESENTLY PREFERRED EMBODIMENTS

Figure 1:
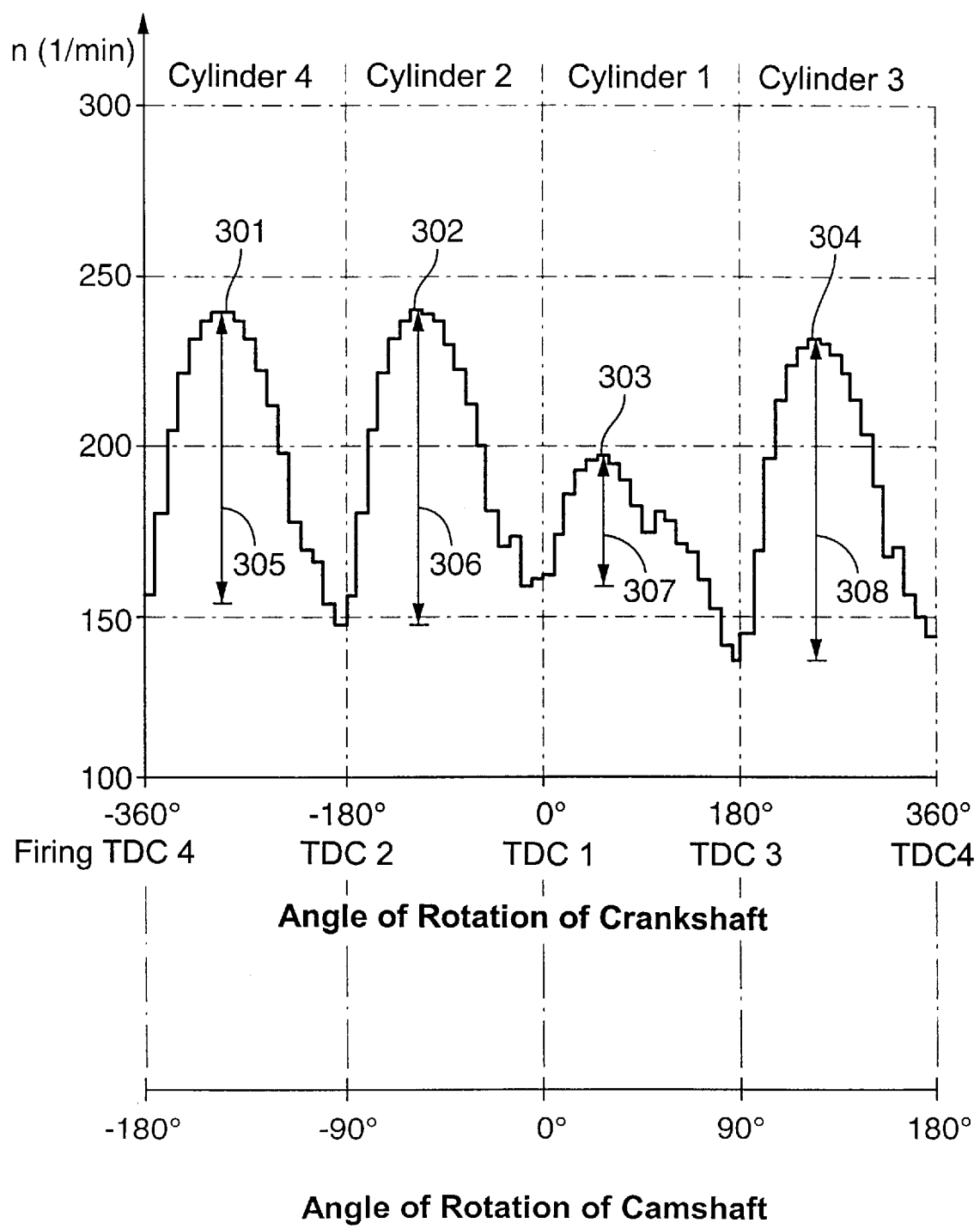
FIG. 1 illustrates a typical plotted curve of the instantaneous crank shaft RPM of a four-cylinder internal combustion engine over a rotation angle of the crank shaft of 720 degrees, with the combustion chamber of cylinder #1 exhibiting a leak.

FIG. 1 shows, by example, a curve form of the crank shaft RPM and the cam shaft RPM as a function of the rotational angle of the crank shaft or rotational angle of the cam shaft, respectively, wherein the signal is controlled by a leak in the combustion chamber of cylinder #1. The curve 301 illustrates a curve form of the RPM of cylinder #4, curve 302 illustrates a curve form of the RPM of cylinder #2, curve 303 illustrates a curve form of the RPM of cylinder #1 and curve 304 illustrates a curve form of the RPM of cylinder #3. The peak amplitude values of the curves 301 to 304 are denoted with the reference marks 305 to 308. It is evident that the amplitude value 307 is noticeably smaller than all the other amplitude values 305, 306, 308. During ejection of the gas, less rotational energy is converted in spite of the additional ejection work to be performed, so that the RPM before the Firing-TDC of cylinder #1 decreases less than for the other cylinders. Moreover, the RPM after the Firing-TDC of cylinder #1 increases less than for the other cylinders.

Figure 2:
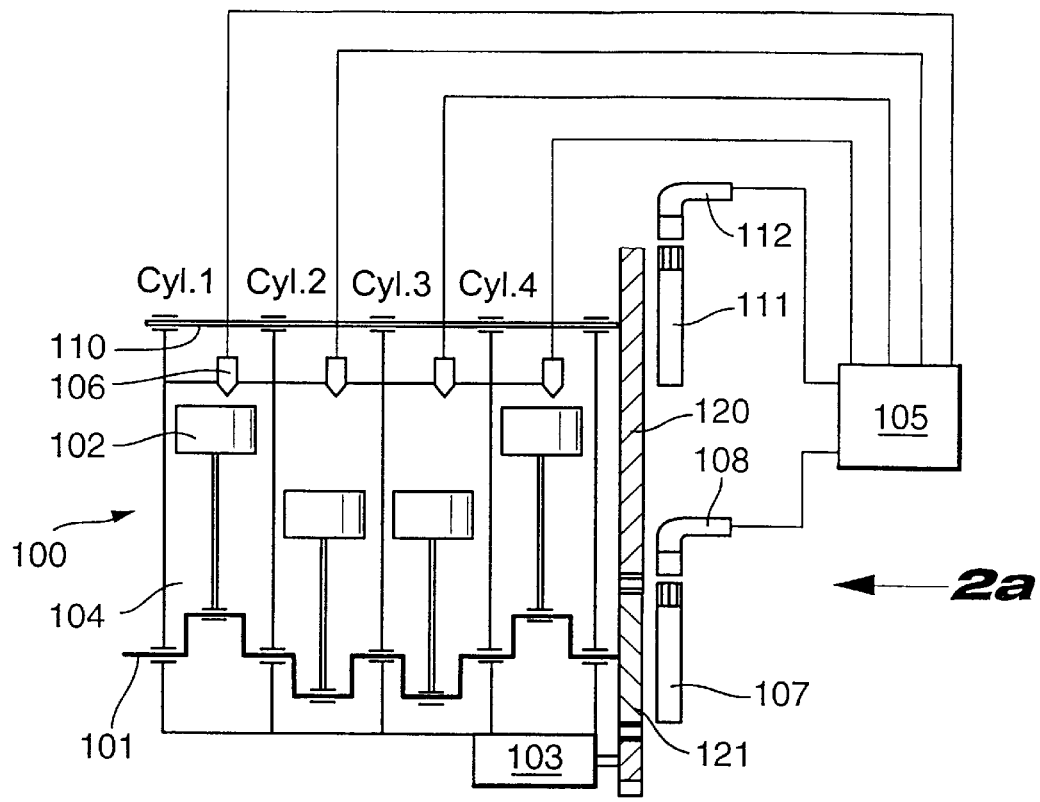
FIG. 2 illustrates an internal combustion engine of the invention.
Figure 2A:
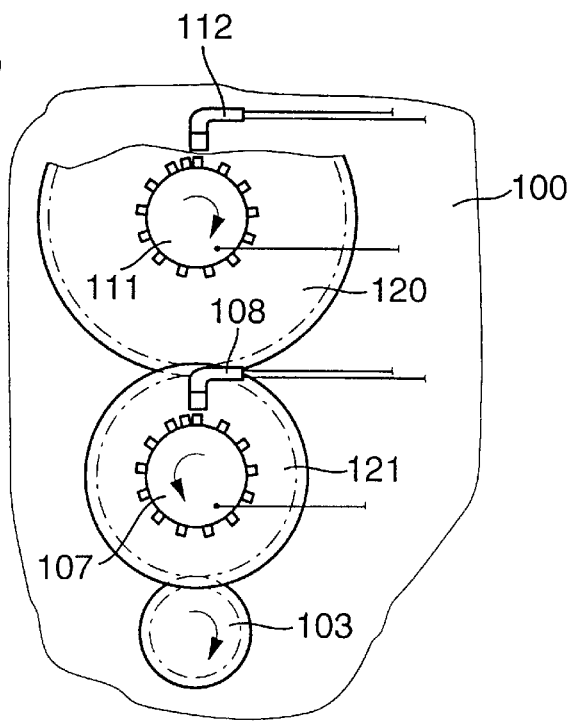
FIG. 2a illustrates a side view of an internal combustion engine shown in FIG. 2.

FIG. 2 shows an internal combustion engine 100 with a crank shaft 101 and a piston 102 movably disposed inside a combustion chamber 104. The engine is cranked or started with the starter 103. For carrying out the method, the engine 100 is operated with the starter 103, wherein the normally occurring combustion in the combustion chambers 104 of the cylinders #1 to #4, for example for a four-cylinder engine, is suppressed or killed by disconnecting the fuel injection through the injection system 106 which is electrically operated by the controller 105. The controller 105 functions as a means for suppressing the combustion process by preventing, for example, the injection of fuel and/or the generation of a spark.

The rotation angle of the crank shaft 101 is herein detected by way of the transmitter wheel 107 and the sensor 108. The transmitter wheel 107 is provided, for example, with teeth which are incrementally detected by the sensor 108. In this way, the rotation angle of the crank shaft can be detected and calculated. The rotation angle of the cam shaft 110 is detected by way of the transmitter wheel 111 and the sensor 112. The transmitter wheel 111 is provided, for example, with teeth which are incrementally detected by the sensor 112. In this way, the rotation angle of the cam shaft can be detected and calculated. The signals of the sensors 112 and 108 are recorded and processed by the controller 105 of the engine control.

The sensor devices form the means for recording the rotation angle of the crank shaft and of the cam shaft. From the temporal change of the rotation angle of the crank shaft, the microprocessor forming part of the controller 105 computes the instantaneous crank shaft RPM. The curve form of the crank shaft RPM is calculated by associating the instantaneous crank shaft RPM with the rotation angle of the crank shaft. The same procedure applies to the determination of the cam shaft RPM from the rotation angle of the cam shaft and the instantaneous cam shaft RPM.

From the plotted curve form of the cam shaft RPM and/or the crank shaft RPM, the microprocessor within the controller computes, for example, the characteristic parameters depicted in FIG. 1.

The transmitter wheels 111, 107 of the crank shaft 101 and the cam shaft 110 each include a respective number of markers, such as teeth, distributed around the circumference in a regular or in an irregular pattern, so that the frequency ratio of the markers of both shafts is fixed as a result of the mechanically defined gear ratio between the crank shaft and the cam shaft which are connected to each other via the gear wheels 120, 121. On the other hand, one of the RPM values can be calculated from the other RPM value and vice versa.

Figure 3:
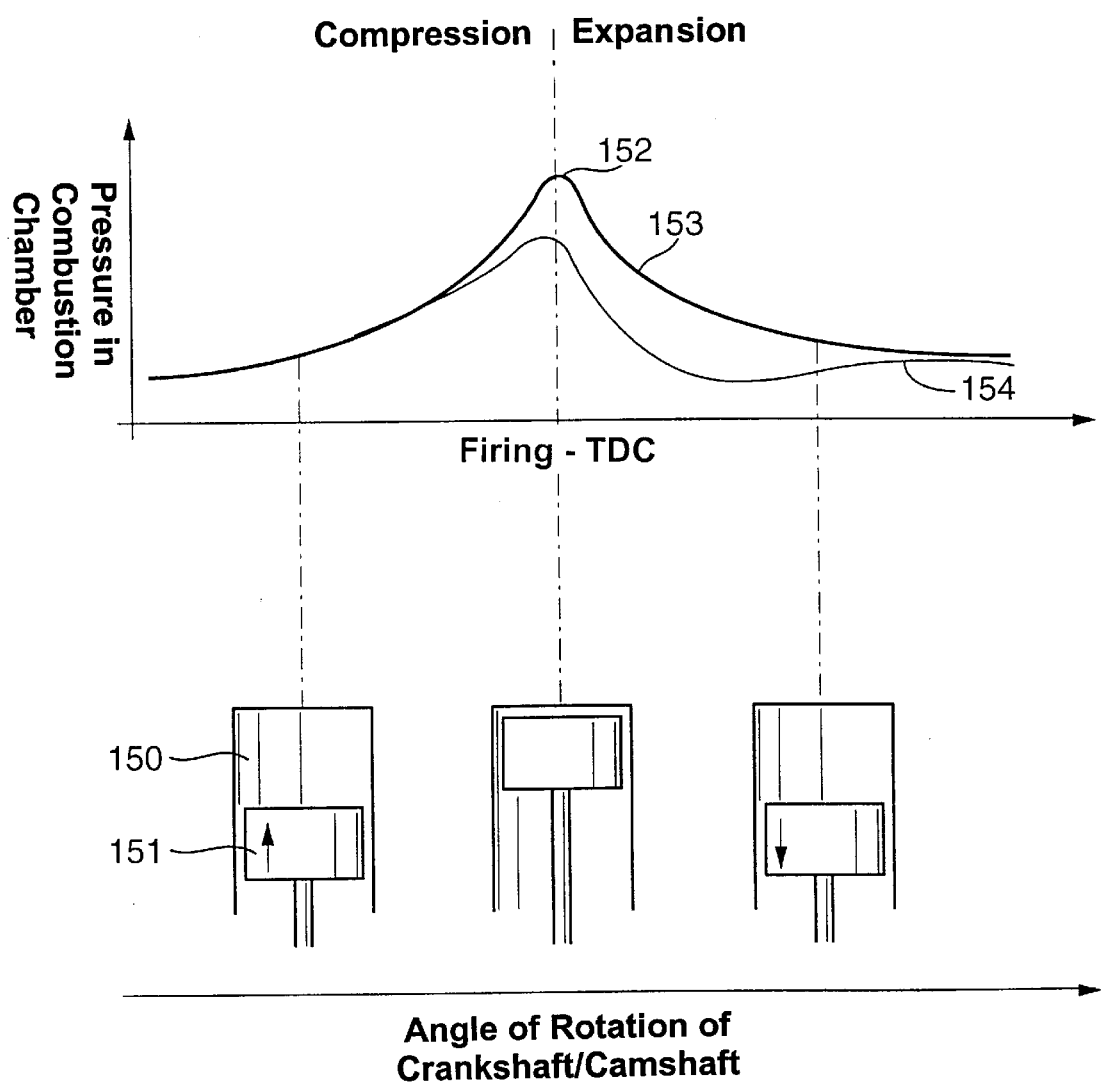
FIG. 3 illustrates a plotted curve showing the pressure in the combustion chamber over the rotation angle of the crank shaft/cam shaft and the piston positions in relation to the plotted curve.

In FIG. 3 there is shown a diagram depicting the pressure in the combustion chamber 150 as a function of the rotation angle of the crank shaft/ cam shaft, with the combustion suppressed. Further in FIG. 3a, the positions of piston 151 inside the combustion chamber 150 are depicted for selected rotation angles. Curve 153 shows the form of a pressure curve without a leak, whereas curve 154 shows a curve form with a leak. The highest compression pressure which occurs when the piston is located at the top dead center TDC, the Firing-TDC, i.e. the point where the mixture is usually ignited, is denoted by the numeral 152. In principle, the pressure during compression increases when the piston moves upward in the cylinder as a result of the decrease in volume associated by this upward motion of the piston, whereas the pressure decreases again when the piston moves downward in the cylinder as a result of the increase in volume associated by this downward motion of the piston. If the combustion chamber is not tight, the pressure dependence 154 is different from that of curve 153, exhibiting an asymmetry as a function of the rotation angle, as compared to the curve without a leak. The pressure during the expansion phase is noticeably lower as a result of the pressure loss caused by a leak.

Figure 4:
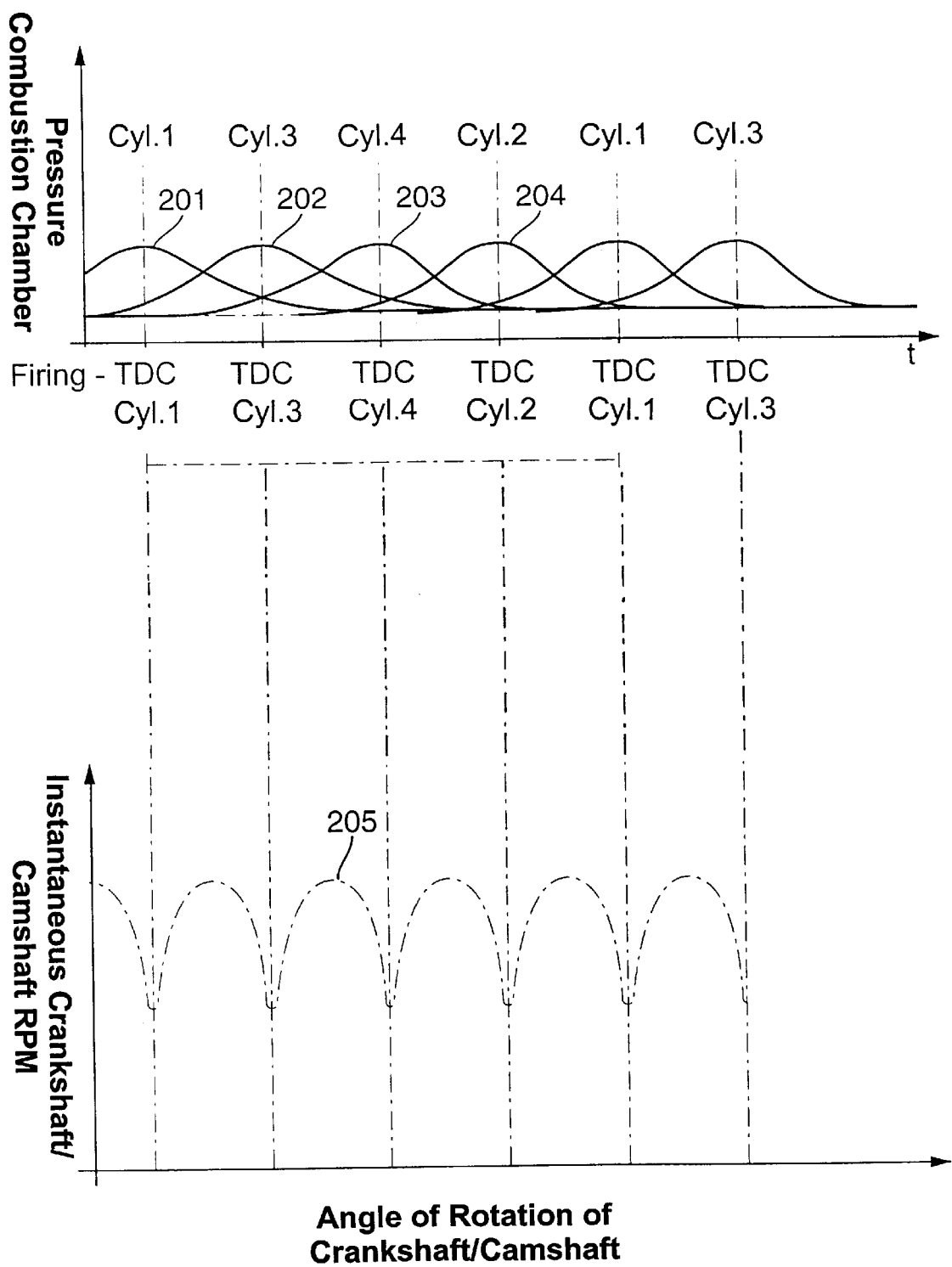
FIG. 4 illustrates a plotted curve showing the pressure in the combustion chamber as a function of time for 4 cylinders and a plotted curve of the instanteneous crank shaft/cam shaft RPM over the rotational angle of the crankshaft/cam shaft.

FIG. 4 shows, in form of a time sequence, exemplary curves of the pressures in the combustion chambers of 4 cylinders 201, 202, 203, 204 (as a function of time t). Since a portion of the rotational energy of the crank shaft and of flywheel masses connected therewith is converted into combustion chamber pressure when the pressure increases in one of the cylinders (#1 to #4), the increase in pressure is associated with a decrease in the RPM. In the same fashion, the RPM increases during the expansion phase. This means that each variation in the curve form of the RPM has to be associated with the pressure changes near the TDC of the respective cylinder. Accordingly, in FIG. 4 there is shown a modulated RPM signal 205 of the instantaneous crank shaft RPM/ cam shaft RPM as a function of the rotation angle.

Figure 5:
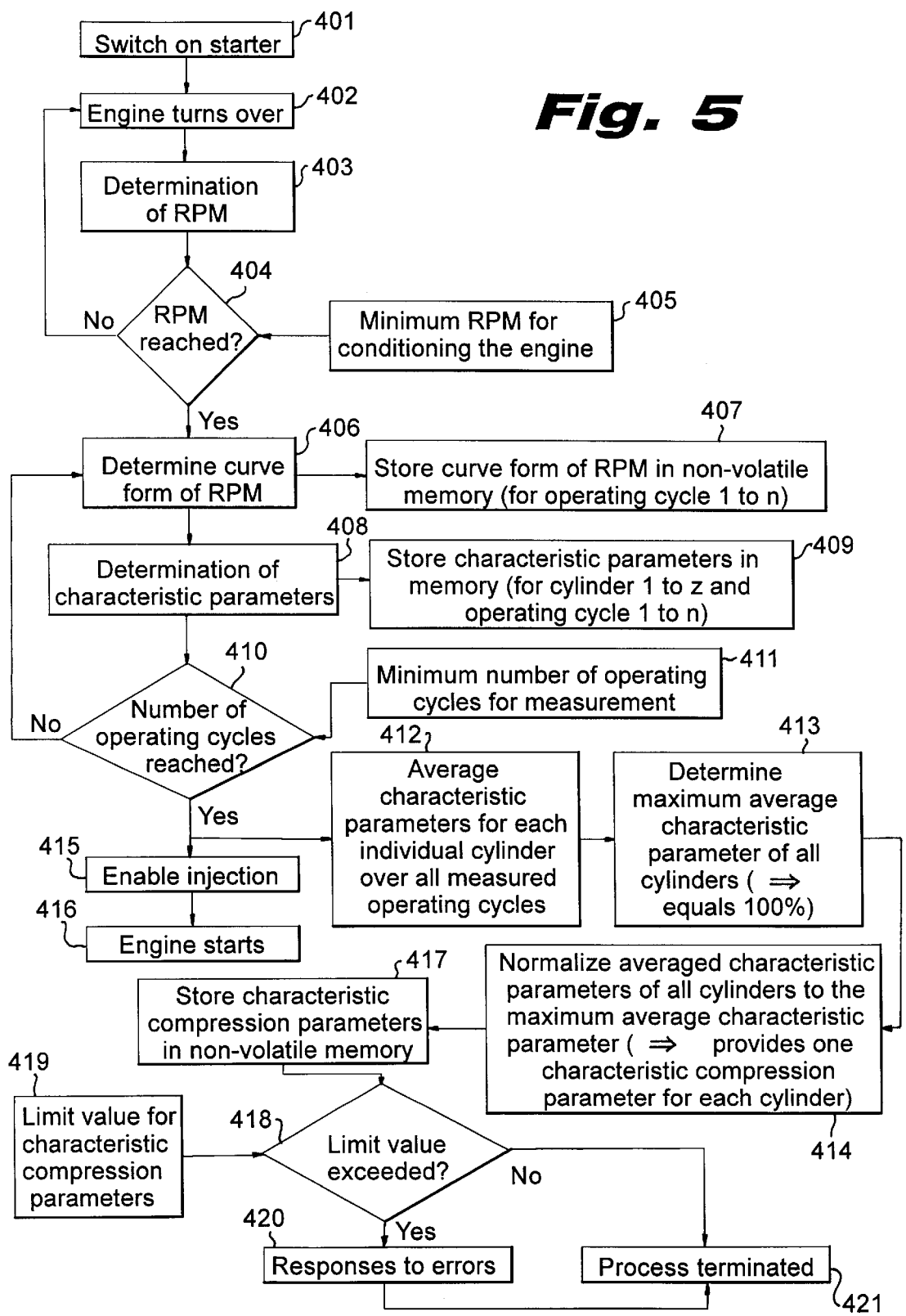
FIG. 5 illustrates a block diagram of the method according to the invention.

FIG. 5 shows a block diagram for illustrating a method according to the invention as well as a way for carrying out the method. The starter is switched on in block 401. In block 402, the engine turns over. In block 403, the RPM of, for example, the crank shaft and/or of the cam shaft and/or of the engine is measured. In block 404, it is queried if a presettable RPM has been reached. This threshold RPM is preset in block 405. In block 406, a curve of the RPM as a function of, for example, the rotation angle is determined. In block 407, this function or the curve form of the RPM are stored in a non-volatile memory of the controller. In block 408, characteristic parameters are determined. These characteristic parameters are stored in block 409. In block 410, there is queried if the number of operating cycles has been reached, wherein the minimum number of operating cycles is preset in block 411. If this is not the case, the process continues with 406, otherwise the characteristic parameters for each individual cylinder are averaged over all measured operating cycles. In block 413, the maximum values of the averaged characteristic parameters of all cylinders are determined. In block 414, the averaged characteristic parameters of all cylinders are normalized to the maximum values of the averaged characteristic parameters. In block 417, the compression values are stored in a non-volatile memory.

In block 418, there is queried if a limit value which is preset in block 419, is exceeded. If no limit value has been exceeded, then the process is terminated at 421, otherwise an error response is initiated at 420.

After block 410, the injection is enabled in block 415 and the engine is started in block 416.

Figure 6A:
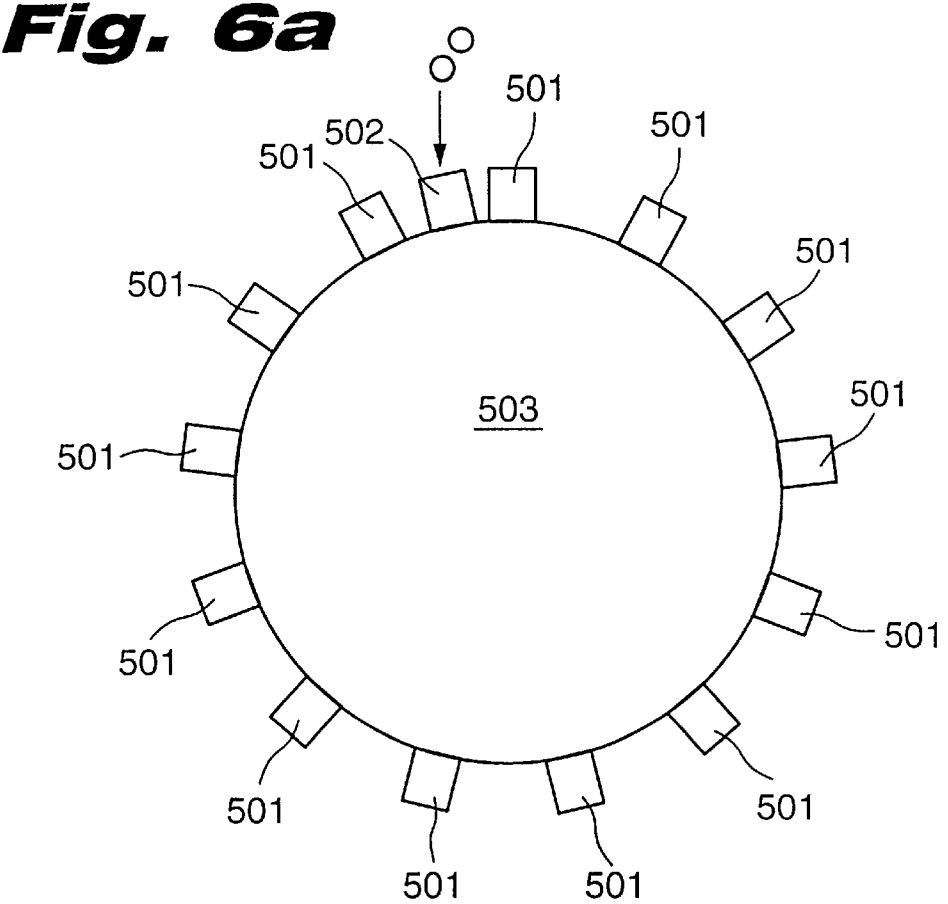
FIG. 6a illustrates a transmitter wheel showing markers.
Figure 6B:
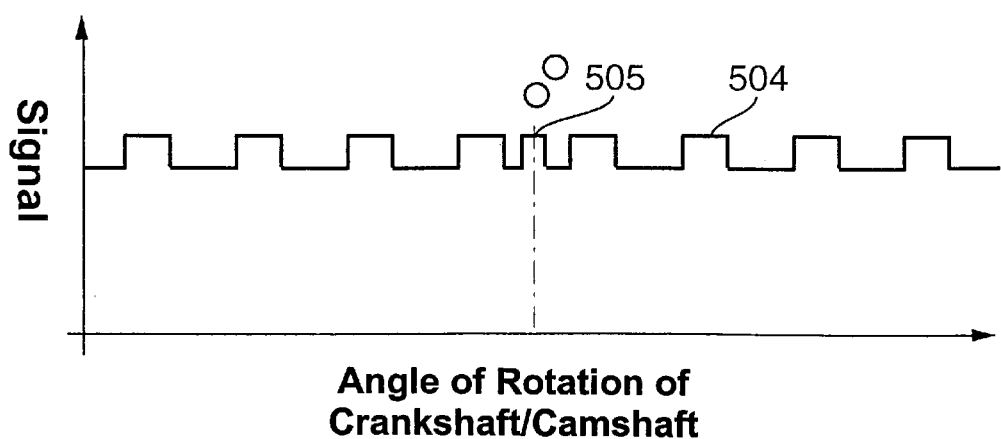
FIG. 6b illustrates a plotted temporal curve of the signals generated by markers and a signal transmitter.

In FIGS. 6a and 6b, there is shown, on one hand, an arrangement of markers 501, 502 on a transmitter wheel 503 and a temporal curve form of the signals 504, 505 generated by the markers and a signal transmitter. The markers 501 are arranged along the edge or circumference of the transmitter wheel with equal spacing therebetween. In addition, the marker 502 is located at a predetermined rotation angle. The controller recognizes the signal 505 of the additional marker element and is able to associate the signal 505 with a rotation angle.

Figure 7:
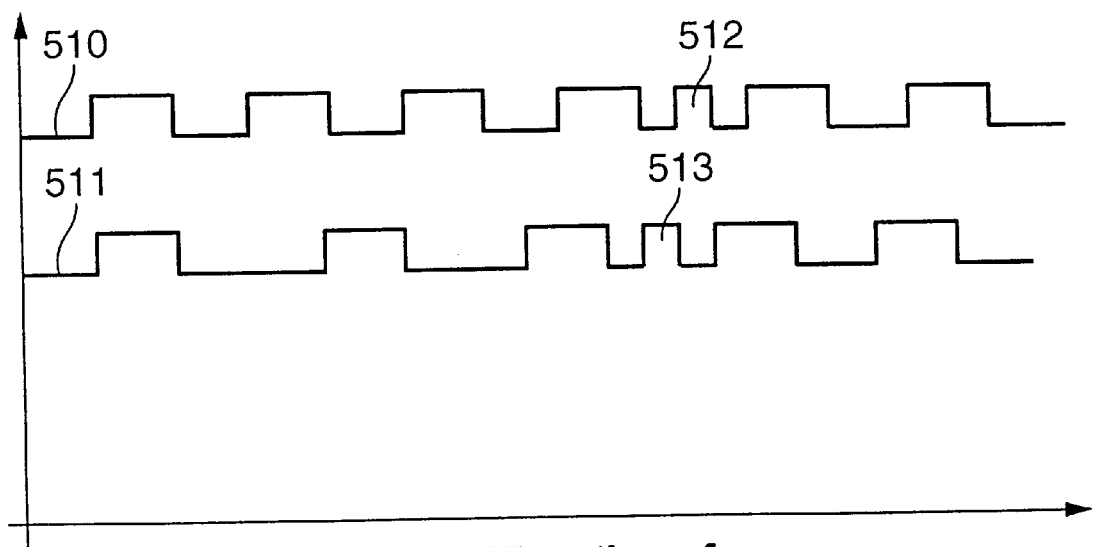
FIG. 7 illustrates a plotted curve of the signals generated by markers and a signal transmitter.

When the crank shaft and the cam shaft are provided with such markers, as depicted in FIG. 6a, signals of the type illustrated in FIG. 7 are obtained. Signal 510 and signal 511 represent signals from the cam shaft and the crank shaft. Signal 512 and signal 513 represent signals from the additional markers. The relative position of the signal forms can be established with the help of markers 502, 503. This means that a precise correspondence between the rotation angles of the crank shaft and the cam shaft can be tested.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for selectively testing for leakage combustion chambers of discrete cylinders having combustion and compression stages and forming part of an internal combustion engine, comprising steps of:

determining the angle of rotation of a crankshaft of the engine;

determining the momentary crankshaft RPM values when the engine is operated in a state of suppressed combustion;

establishing a set of values denoting the momentary crankshaft RPM values for each cylinder as a function of the angle of rotation of the crankshaft in the course of at least one of said stages; and ascertaining on the basis of the set of values a value of the momentary crankshaft RPM as an indication of a cylinder having a leakage in its combustion chamber.

2. The method according to claim 1, further comprising the step of determining pressure values generated in the combustion chambers of the cylinders as a function of time and converting the set of values denoting the function of the momentary crankshaft RPM values for each cylinder over the angle of rotation of the crankshaft with the pressure values as a function of time to obtain adjusted momentary crankshaft RPM values.

3. The method according to claim 2, wherein the step of determining the momentary crankshaft RPM comprises the step of averaging the RPM values over several momentary crankshaft RPM values at the same angle of rotation of the crankshaft during a periodically repeating operating cycle of the internal combustion engine.

4. The method according to claim 3, wherein the method for selectively testing leakage is conducted after cooling down the internal combustion engine and after briefly operating the engine with non-suppressed combustion.

5. The method according to claim 4, wherein the angle of rotation of a crankshaft is determined by a measuring device comprising a first signal transmitter cooperating with the crankshaft and further comprising the step of determining the momentary crankshaft RPM values with a processing unit.

6. The method according to claim 5, further comprising the step of utilizing a camshaft and wherein the angle of rotation of a camshaft is measured with a second signal transmitter and wherein the angle of rotation of the crankshaft is correlated with the operating cycle of the internal combustion engine.

7. The method according to claim 6, further comprising the steps of monitoring the performance of the first and second signal transmitters by testing the ratio of the first and second signal transmitter.

8. The method according to claim 5, further comprising the step of utilizing measuring markers on the first and second signal transmitters for identifying a predetermined angle of rotation of the camshaft and the crankshaft.

9. The method according to claim 8, wherein signals transmitted by the signal transmitters of the crankshaft and the camshaft are utilized to test the synchronization between the crankshaft and the camshaft.

10. The method according to claim 9, wherein the angle of rotation of the crankshaft and the crankshaft RPM are determined from the rotation angle of the camshaft.

11. The method according to claim 10, further comprising the step of storing the set of values with the momentary crankshaft RPM values in memory for comparative testing after one of manufacture of the internal combustion engine, after a repair and for testing after an arbitrarily selected time interval.

* * * * *

UNITED STATES PATENT AND TRADEMARK OFFICE
Certificate

Patent No. 5,945,593                                                  Patented: August 31, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ralf Magiera, Neuenrade, Germany; Christof Howold, Sundern, Germany; Peter Schimmelpfennig, Erlangen, Germany; and Wolfgang Gutbrod, Möhrendorf, Germany.

Signed and Sealed this Twenty-first Day of September 2004.

HEZRON E. WILLIAMS
*Supervisory Patent Examiner*
Art Unit 2856